United States Patent [19]

Grimm

[11] Patent Number: 4,930,611

[45] Date of Patent: Jun. 5, 1990

[54] ROTARY TRAVEL LIMIT STOP

[75] Inventor: Duane H. Grimm, Rockford, Ill.

[73] Assignee: Sundstrand Corporation, Rockford, Ill.

[21] Appl. No.: 360,508

[22] Filed: Jun. 2, 1989

[51] Int. Cl.$^5$ .................. F16D 71/00; F16D 65/14
[52] U.S. Cl. ............................ 192/139; 192/7; 188/134
[58] Field of Search ............. 192/7, 139; 188/134; 74/10.2

[56] References Cited

U.S. PATENT DOCUMENTS

| | | | |
|---|---|---|---|
| 2,356,167 | 8/1944 | McKelvey | 74/640 |
| 2,852,630 | 9/1958 | Burrows . | |
| 3,147,629 | 9/1964 | Michalec . | |
| 3,203,262 | 8/1965 | Beer . | |
| 3,662,610 | 5/1972 | Thoen . | |
| 4,064,981 | 12/1977 | House et al. . | |
| 4,641,737 | 2/1987 | Gillingham et al. . | |

Primary Examiner—Rodney H. Bonck
Attorney, Agent, or Firm—William D. Lanyi

[57] ABSTRACT

A rotary travel limit stop is provided to cause the rotation of the rotary actuator to cease. Second and third rotatable members are arranged in gear mesh association with the first rotatable member and the second and third rotatable members are provided with different numbers of gear teeth so that the rotate at different speeds when the first rotatable member is caused to rotate. The different rates of rotation of the second and third rotatable members result in an axial movement away from each other by the second and third rotatable members when a cam structure is positioned at a preselected relative location as a result of a relative rotation between the second and third rotatable members.

This axial movement of the second and third rotatable members away from each other causes moveable stop pins or protuberances to move into interfering relation with fixed stop pins or protuberances. During the following revolution of the second and third rotatable members, the stop pins or protuberances move into contact with each other and stop subsequent rotation of the device.

5 Claims, 5 Drawing Sheets

ROTARY TRAVEL LIMIT STOP

BACKGROUND OF THE INVENTION

1. Field of the Invention

The present invention is generally related to the field of rotary travel limit stops and, more particularly, to an apparatus which provides the axial movement of a rotatable member following a preselected number of revolutions of that rotatable member from a predetermined initial position. After the rotatable member rotates the preselected number of revolutions, it is axially shifted to cause a first stop pin to engage a second stop pin, wherein the second stop pin is rigidly attached to a housing structure which supports the rotatable member.

2. Description of Related Art

Many different types of actuators have been used to move devices such as aircraft control surfaces. When those actuation devices reach end of travel positions, some means must be provided to cause the actuation system to stop. U.S. Pat. No. 2,852,630 which issued to Burrows on Sept. 16, 1958, discloses a limit switch actuator which provides a means for actuating limit switches on electrically operated cranes. The limit switches are used to shut off the drive to a drum or barrel when a rope or chain is fully wound thereon. The operating means of the actuator includes a shaft which carries two gear wheels having different numbers of teeth. One of the gear wheels is fixed on the shaft and the other gear wheel is loose. Both gear wheels mesh with a single pinion which is rotatable in a housing driven by the drum or barrel. The shaft is normally stationery so that the loose gear wheel is rotated thereon as the housing revolves and the gearwheels have parts which engage with one another after a given number of revolutions of the housing. Since the pinion is in mesh with two locked gear wheels of slightly different pitch, it also becomes locked on its axis because of the fact that the gear wheels have numbers of teeth which differ from each other and have a dog or stop on the side which faces the other wheel. This enables one of the wheels to lock with the other wheel when the dogs come into contact with each other.

U.S. Pat. No. 3,147,629 which issued to Michalec on Sept. 8, 1964, discloses a multiturn stop mechanism. This multiturn stop mechanism comprises first and second gears mounted for independent rotation about a common axis and axially spaced a short distance. These gears are mechanically interconnected by auxiliary gearing with the various ratios being selected so that the first and second gears rotate at different rates. The second gear may have one more tooth than the first while the auxiliary gearing may be a single pinion meshing with both gears. Each gear has a small protuberance or block fastened to that side which adjacent to the other gear and the blocks are positioned at substantially equal radial distances from the common axis. A multilobed locking device such as a multifigured arm or star wheel is pivoted about an axis parallel for the common axis and is so placed that one lobe always extends between the gears into the path of movement of the blocks. Each revolution of the gears brings the blocks closer together by one gear tooth space until a point is reached at which engagement of one lobe by the first block causes the next lobe to abut the second block, thereby providing a positive stop.

U.S. Pat. No. 3,203,262 which issued to Beer on Aug. 31, 1965, discloses a limited multiple turn rotary mechanism. The mechanism comprises two gears of substantially equal diameter mounted for independent rotation about a common axis and axially spaced a distance on the order of the thickness of the gears. The number of teeth in the two gears differ by one and both are driven by a common pinion gear. Thus, the gears rotate at different rates. Near the periphery of each gear on the facing sides a small block is fastened which extends toward but does not touch the other gear. A multilobe cam wheel is mounted for rotation so that the cam lobes extend between the gears and into the path of the blocks. As the gears rotate, the blocks approach each other until a point is reached at which one block engages one cam lobe and the other block another cam lobe which prevents further movement.

U.S. Pat. No. 3,662,610 which issued to Thoen on May 16, 1972, discloses a multiturn limit stop apparatus. The mechanism comprises a pinion, a gear in engagement with the pinion and stop members affixed to the pinion and gear. The ratio of the number of gear teeth to the number of pinion teeth is not an integer. The stop member affixed to the pinion extends beyond the periphery of the pinion and sweeps out an epitrochoidal path with respect to the gear pitch circle as it rotates. The stop member affixed to the gear is positioned inside the gear pitch circle. Since the ratio is not an integer, the epitrochoidal loops of the pinion stop member rotate with respect to the gear pitch circle on each gear revolution. Rotation in one direction is limited when the epitrochoidal path for the pinion stop member on a particular rotation contacts the gear stop member.

U.S. Pat. No. 4,064,981 which issued to House et al on Dec. 27, 1977 discloses a limit stop apparatus. The apparatus comprises a driven shaft which rotates a predetermined number of revolutions in either direction whereupon a traveling nut assembly contacts a shock absorbing stop to terminate shaft rotation by frictionally jamming screw threads between the nut assembly and the driven shaft. Outer and inner portions of the nut assembly are connected for limited relative rotational motion on nonjamming auxiliary threads, thus permitting the driven shaft to backed off to release the nut assembly from the shock absorbing stop and thereby release the jammed threads with a minimum of available torque. By this structure, locking of the limit stop at either end is prevented.

U.S. Pat. No. 4,641,737 which issued to Gillingham et al on Feb. 10, 1987, discloses a bi-directional overtravel stop. The overtravel stop has a pair of gears associated with the shaft to rotate their width. Each gear engages an associated limiting gear and the two engaged gear pairs have different gear ratios. One of the limiting gears is threaded over a shaft which is secured for rotation with the other limiting gear, such that the different gear gear ratios causes the one limiting gear to translate over the shaft. At selected travel limits, the one limiting gear is caused to lock relative to the other, thereby, causing one of the gears associated with the shaft to shift their around. A cam structure is provided whiCh axially shifts a stop member associated with the shaft into engagement with a fixed stop when the one gear shifts about the shaft. Two different cam structures are shown including a pin and slot connection between the stop member and the shaft and an ear and cam recess connection between the stop member and one of the shaft gears.

Co-pending patent application (S.N. B360509), which is assigned to the assignee of the present application, discloses a rotary travel limit stop mechanism which comprises a first gear that is disposed in gear mesh association with second and third gears. The second and third gears are provided with different numbers of teeth so that they rotate at different rates when the first rotatable member rotates. The different rates of rotation cause the second and third gears to rotate relative to each other. The third gear is provided with an annular groove which has a varying depth. The second gear is provided with a pin which is slidably associated in a hole of the second gear. The annular groove of the third gear is associated with the head of the pin and, when the second and third gears reach a preselected position relative to each other, the head of the slidable Pin is caused to move axially with respect to the second gear due to the decreased depth of the groove in the third gear. This movement causes a portion of the pin to move into interfering relation with a fixed stop pin and, when the slidable pin contacts the fixed stop pin, further rotation of the gear members is prevented.

SUMMARY OF THE INVENTION

The present invention provides an apparatus which is used to stop the rotation of a gear system when the gear system reaches a predetermined end-of-travel position. When rotated in an opposite direction, the mechanism also provides a second stop position at the opposite end of travel.

In a preferred embodiment of the present invention, the rotary travel limit stop apparatus comprises a first rotatable member having a first axis of rotation and a second rotatable member having a second axis of rotation with the second rotatable member being associated with the first rotatable member to rotate in coordination with the first rotatable member at a speed related to the speed of the first rotatable member by a first ratio. In a most preferred embodiment of the present invention, the first and second rotatable members are gears which are associated in gear mesh relation with each other. A third rotatable member, having a third axis of rotation, is associated with the first rotatable member to rotate in coordination with the first rotatable member at a speed related to the speed of the first rotatable member by a second ratio. The first and second ratios are unequal to each other. In a most preferred embodiment of the present invention, the third rotatable member is a gear which is disposed in gear mesh relation with the first rotatable member. Furthermore, the second and third rotatable members are provided with a different number of teeth so that rotation of the first rotatable member causes the second and third rotatable members to rotate at different speeds.

The rotary travel limit stop apparatus of the present invention, in a preferred embodiment, also provides a means connected to the second and third rotatable members for causing the third rotatable member to move axially away from the second rotatable member when the first rotatable member rotates a preselected number of revolutions from a predefined initial position. This causing means can comprise either of two or more devices in different embodiments of the present invention. One embodiment of the present invention utilizes a cam follower device such as a roller, which is attached to the second rotatable member. The third rotatable member is provided with a cam surface, such as a ramp, which is attached to the third rotatable member. When the second and third rotatable members reach a preselected position relative to each other, the cam follower moves up the ramp and exerts an axial force against the third rotatable member, causing it to move axially away from the second rotatable member. In an alternative embodiment of the present invention, the causing means comprises a first cam surface attached to the second rotatable member and a second cam surface attached to the third rotatable member with both cam surfaces being disposed in sliding contact relation with each other. Ramps are provided in both cam surfaces so that, when the second and third rotatable members achieve a predetermined position relative to each other, the ramps of the cam surfaces exert axial forces against their opposing members and cause the third rotatable member to move axially away from the second rotatable member.

The third rotatable member is provided with at least one protuberance, or pin, which rotates with the third rotatable member. A housing structure, which is support relation therein, is provided with a fixed proshaped to support relation therein, is provided with a fixed tuberance, or pin, which is rigidly attached to the structure. When the third rotatable member is shifted axially away from the second rotatable member, the first protuberance which is attached to the third rotatable member moves into interfering relation with the fixed protuberance which is attached to the structure. When the third rotatable member rotates the first protuberance into this interfering relation, the two protuberances move into contact with each other and stop the rotation of the third rotatable member. Because of the gear mesh relation between the first, second and third rotatable members, the entire mechanism is stopped from any further rotation. The device works similarly when the gears are rotated in opposite directions.

BRIEF DESCRIPTION OF THE DRAWING

The present invention will be more fully understood from a reading, of the description of the preferred embodiment in conjunction with the drawing, in which.

DESCRIPTION OF THE PREFERRED EMBODIMENT

Throughout the description of the preferred embodiment, like devices are identified by like reference numerals. FIGS. 1, 2, 3 and 4 illustrate a first embodiment of the present invention and FIGS. 5, 6A, 6B and 6C illustrate a second embodiment of the present invention.

Figure 1:
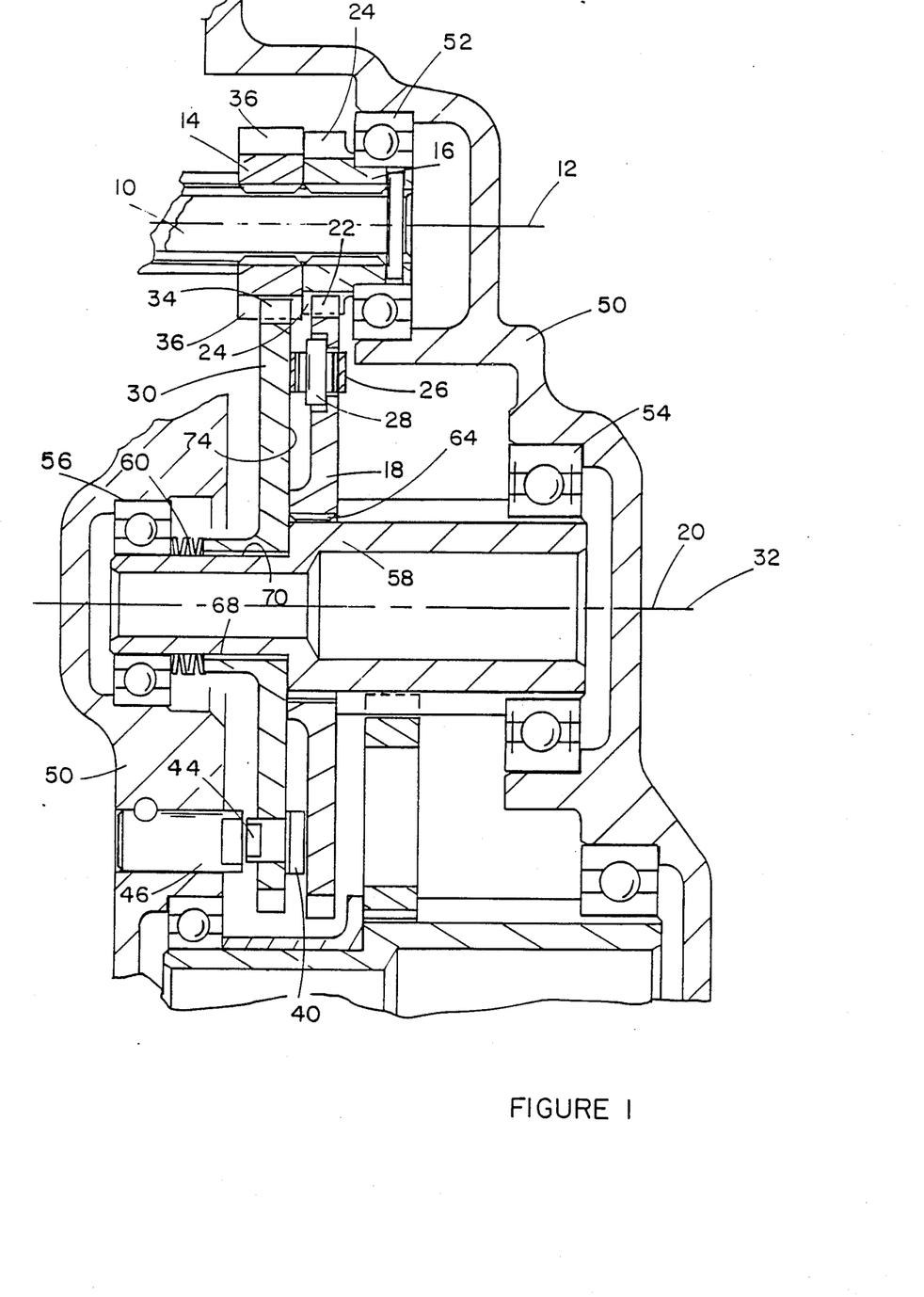
FIG. 1 illustrates a cross section of a gear box containing one embodiment of the present invention.

FIG. 1 illustrates a gearbox which comprises a first embodiment of the present invention. A first rotatable member 10 is provided to be driven by some external power source (not shown in FIG. 1). The first rotatable member 10 is disposed to rotate about a first axis of rotation 12. It is also provided with a plurality of gear teeth. In the embodiment of the present invention illustrated in FIG. 1, the gear teeth are contained in segments 14 and 16. A second rotatable member 18 has a second axis of rotation 20 and is associated in gear mesh relation with the first rotatable member 10. The teeth 22 of the second rotatable member 18 are associated in gear mesh relation with the teeth 24 of the second segment 16 of the first rotatable member 10. A cam follower 26 is rotatably connected to the second rotatable member 18. As shown in FIG. 1, the cam follower 26 can be a roller arranged to rotate about a central pin 28 which is attached to the second rotatable member 18.

A third rotatable member 30 has a third axis of rotation 32 and is provided with a plurality of gear teeth 34 which are associated in gear mesh relation with a plurality of gear teeth 36 in the first segment 14 of the first rotatable member 10. It should be understood that the second rotatable member 18 is provided with a different number of gear teeth 22 than the gear teeth 34 of the third rotatable member 30. The third rotatable member 30 is provided with a cam surface 40 or ramp, which will be described in greater detail below. In a preferred embodiment of the present invention, rotation of the first rotatable member 10 causes the second 18 and third 30 rotatable members to rotate at different speeds about their respective axes of rotation, 20 and 32 respectively. This different rate of rotation causes relative rotation to occur between the second rotatable member 18 and the third rotatable member 30. As this relative rotation continues, the cam follower 36 eventually moves into contact with the cam surface 40. When this contact occurs, an axial force is exerted between the second rotatable member 18 and the third rotatable member 30 which causes the third rotatable member 30 to move axially away from the second rotatable member 18.

The third rotatable member 30 is provided with a protuberance 44 which is attached to the third rotatable member 30. Another protuberance 46, is rigidly attached to a fixed structure such as the housing structure 50 illustrated in FIG. 1. In a preferred embodiment of the present invention, the housing structure 50 is shaped to receive the first, second and third rotatable members in bearing support relation. For example, bearing 52 supports the first rotatable member 10 and bearings 54 and 56 support the second and third rotatable members. As can be seen in FIG. 1, a shaft 58 is provided to carry both the second rotatable member 18 and the third rotatable member 30.

Figure 2:
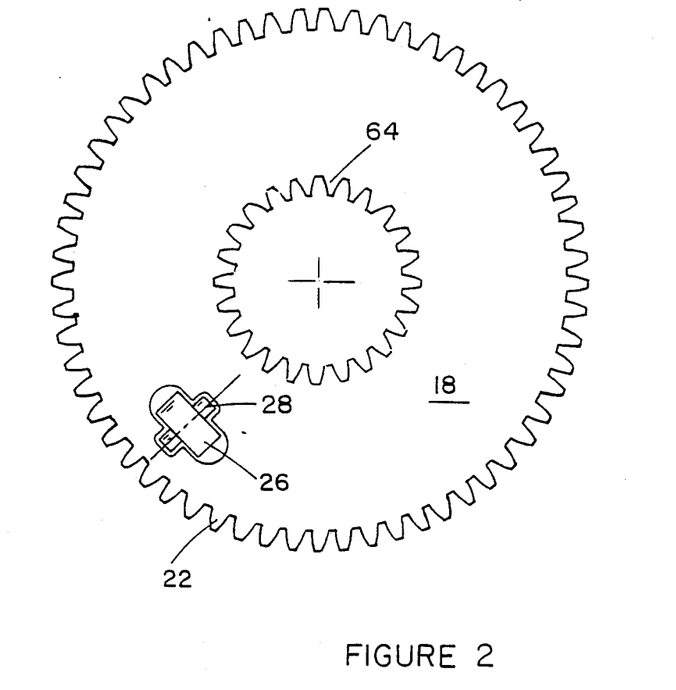
FIG. 2 illustrates the second rotatable member of the present invention.

FIG. 2 illustrates the second rotatable member 18 of the preferred embodiment of the present invention. It comprises a plurality of gear teeth 22 which are associated in mesh relation with the gear teeth 24 of the first rotatable member 10 when the second rotatable member 18 of FIG. 2 is assembled in a gear box as illustrated in FIG. 1. The inner diameter of the second rotatable member 18 is Provided with a plurality of spline teeth 64 which are associated with spline teeth on the shaft 58 when the second rotatable member 18 is assembled in the gearbox as illustrated in FIG. 1. The spline teeth 64 permit the second rotatable member 18 to rotate in synchronization with the shaft 58. The cam follower 26, or roller, is rotatably connected to the second rotatable member 18 by the Pin 28. As described above, the cam follower 26 is positioned to roll along the surface of the third rotatable member 30 and, eventually, onto the ramp 40 of the third rotatable member 30.

Figure 3:
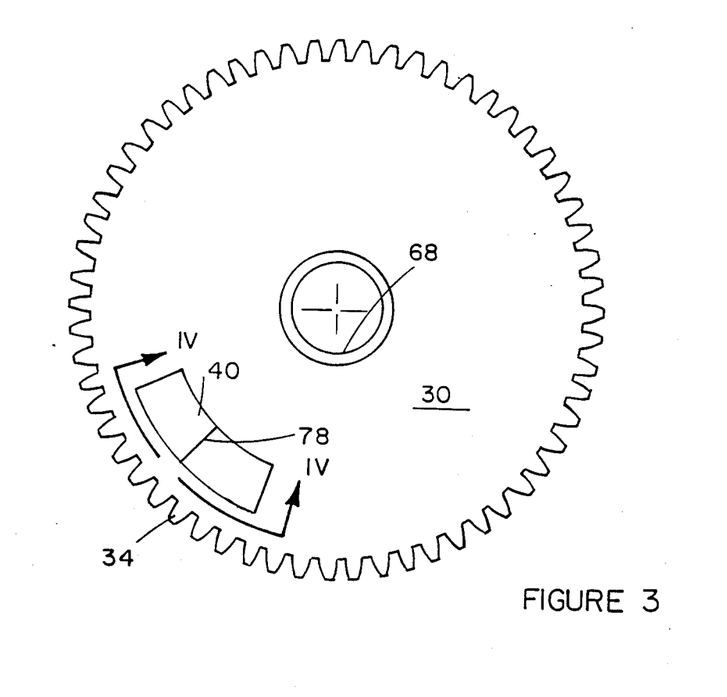
FIG. 3 illustrates the third rotatable member of the present invention.

FIG. 3 illustrates the third rotatable member of the present invention. The inner diameter 68 of the third rotatable member 30 is shaped to receive a portion 70 of the shaft 58 in sliding relation therein. When assembled onto the shaft 58, as illustrated in FIG. 1, the third rotatable member 30 is permitted to rotate relative to the shaft 58 and to translate axially relative to shaft 58. Its rotatational and axial position is determined by the mesh relation between the gear teeth 34 and the gear teeth 36, as shown in FIG. 1, and the spring 60 which forces the third rotatable member 30 towards the right in FIG. 1.

As illustrated in FIG. 3, the third rotatable member 30 is provided with a cam surface 40, or ramp, which is disposed at generally the same radius relative to the axes of rotation 20 and 32 as the cam follower 28 of the second rotatable member 18. As the second and third rotatable members revolve about their axes of rotation 20 and 32 at different rates of speed, the cam follower 26 eventually moves into contact with the cam surface 40. When this occurs, an axial force is exerted against the third rotatable member which causes the second and third rotatable members to move apart from each other. Since the axial movement of the second rotatable member 18 is restrained, this relative axial movement causes the third rotatable member 30 to move toward the left in FIG. 1 against the resistance of the spring 60. As described above in relation to FIG. 1, this relative movement causes the protuberanCe 44 to move into interferinq relation with the protuberance 46.

Figure 4:
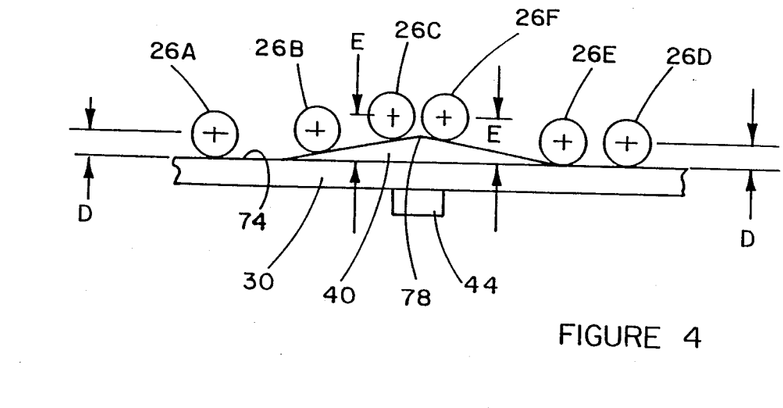
FIG. 4 illustrates a sectional view of the ramp portion of the device illustrated in FIG. 3.

FIG. 4 illustrates the relative movement between the cam follower 26 and the cam surface 40. In FIG. 4, various positions of the cam follower 26 are represented by reference numerals 26A-26F. As represented by the position of cam follower 26A in FIG. 4, the cam follower is shown in rolling contact with the surface 74 of the third rotatable member 30. This results in the centerline of the cam follower 26A being a distance from the surface 74 represented by the relative dimension D. This distance D defines the relative axial position between the second and third rotatable members during the period of operation when the cam follower 26A is not in contact with the cam surface 40, or ramp. Eventually, because of the relative rotation of the second and third rotatable members, the cam follower will move into the position rePresented by cam follower 26B in FIG. 4. This position represents the movement of the cam follower onto the cam surface 40. As the second and third rotatable members continue to revolve about their respective centerline as a result of the relative rotation of the second and third rotatable members, the dimension between the centerline of the cam follower 26C and the surface 74 of the third rotatable member 30 increases to that relative position indicated by dimension E in FIG. 4. As the cam follower moves up the cam surface 40, the dimension between the centerline of the cam follower 26C and the surface 74 of the third rotatable member 30 increases and causes the second and third rotatable members to move apart. This relative axial motion between the second and third rotatable members causes the third rotatable member to move toward the left in FIG. 1 and, in turn, causes the protuberance 44 to move into interfering relation with the protuberance 46. Eventually, during the continued rotation of the third rotatable member, the protuberance 44 will move into contact with protuberance 46 and the subsequent rotational movement of the third rotatable member will be stopped. Since the third rotatable member is associated in mesh relation with the first rotatable member 10, the further rotation of the rotatable members shown in FIG. 1 will be prevented and the mechanism will be effectively stopped.

To illustrate the fact that the present invention works in both directions of rotation, the relative movement of the cam follower 26 is represented in FIG. 4, in sequential positions, by reference numerals 26D, 26E and 26F. As the cam follower 26 moves, relative to the third rotatable member, it eventually moves from the position indicated by reference numeral 26B to that indicated by reference 26F and the relative spacing between the centerline of the cam follower and the surface 74 of the third rotatable member 30 increases from that represented by dimension D to that represented by dimension E with the result that the second and third rotatable members will be forced apart and the third rotatable member will be moved toward the left in FIG. 1. It should be clearly understood that the illustration shown in FIG. 4 and described above is intended to show the relative positions between the cam follower 26 and the third rotatable member 30. In FIG. 4, a single representation of the third rotatable member 30 and its cam surface 40 is used in conjunction with several illustrative positions of the cam follower 26. However, it should be clearly understood that in operation the cam follower 26 maintains a constant axial position relative to the housing 50 and relative to the shaft 58 while the third rotatable member 30 is caused to move axially away from the position of the cam follower 26 when the cam follower 26 moves into contact with the cam surface 40 of the third rotatable member 30. In other words, during the operation of the preferred embodiment of the present invention, the third rotatable member 30 moves axially away from the second rotatable member 18 in response to the axial force produced by the movement of the cam follower 26 on the cam surface 40. However, it should also be understood that in alternative embodiments of the present invention, the first, second and third rotatable members could be configured and arranged to cause the relative axial movement between the second and third rotatable members to result in an axial movement of the second rotatable member while the third rotatable member remains in a constant axial position.

Figure 5:
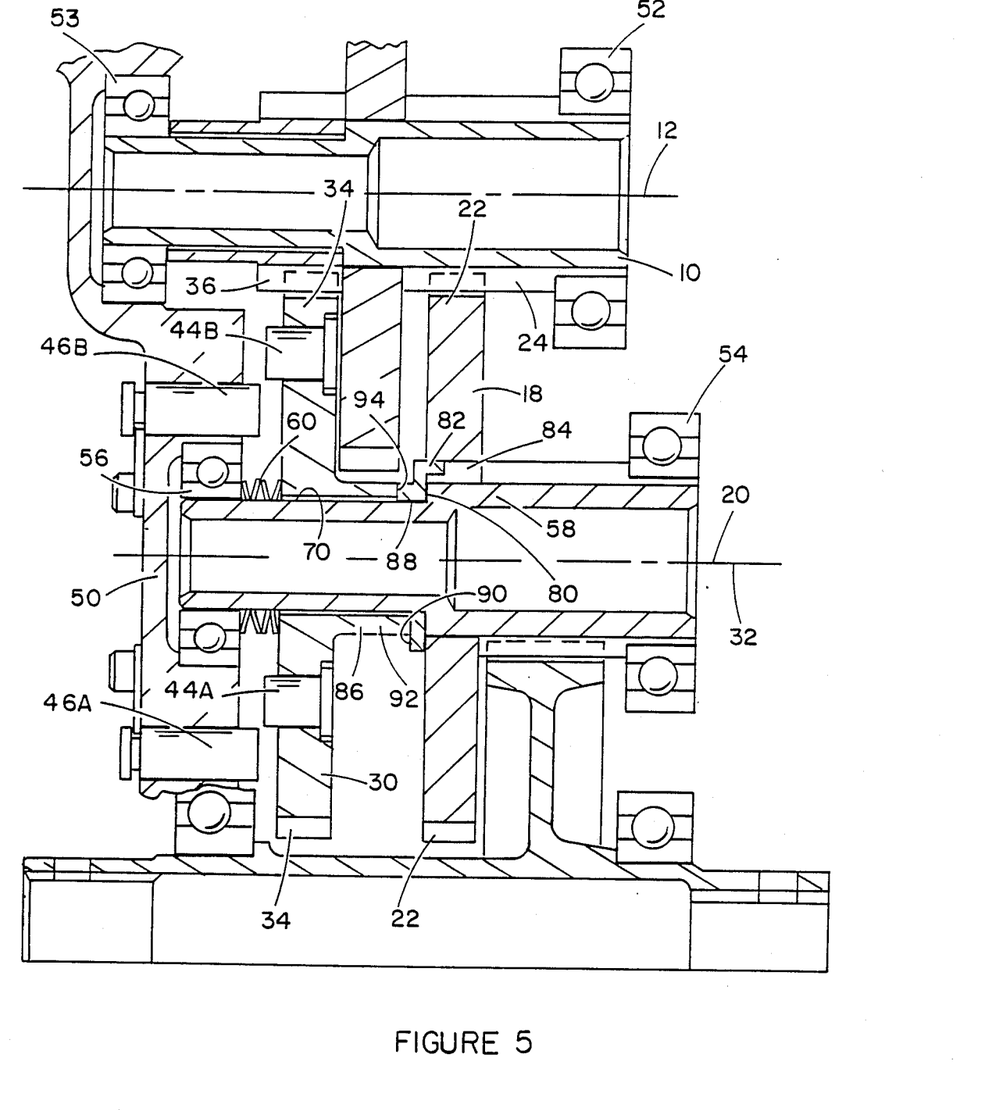
FIG. 5 illustrates a gearbox comprising a second embodiment of the present invention.

FIG. 5 illustrates an alternative embodiment of the present invention. While the overall operation of the embodiment shown in FIG. 5 is generally similar to that of the embodiment shown in FIG. 1, the specific technique used to cause the axial movement of the third rotatable member 30 differs in technique from that used to cause the axial movement of the third rotatable member 30 in FIG. 1. As can be seen, the configuration shown in FIG. 5 is generally similar to that shown in FIG. 1. However, the cam follower 26 of the second rotatable member 18 and the cam surface 40 of the third rotatable member 30, which are present in the embodiment of FIG. 1, are not provided in the embodiment shown in FIG. 5. Instead, the second rotatable member 18 of the alternative embodiment shown in FIG. 5 is provided with a first cam member 80. Although the first cam member 80 is a separate component, it is associated with the second rotatable member 18 for synchronized rotation with the second rotatable member by the use of the tab 82 which is disposed in an opening 84 of the second rotatable member 18. The first cam member 80 is provided with a raised portion 88. The raised portion 88, as will be described in greater detail below, provides ramp surfaces which extend away from another surface 90 of the first cam member 80.

The third rotatable member 30 is provided with a second cam member 86 which is a cylindrically shaped extension of the third rotatable member 30. As shown in FIG. 5, the second cam member 86 has a first portion 94 which provides a generally flat surface and a second portion 92 which provides a raised portion which extends axially toward the right in FIG. 5 relative to the flat surface 94.

Figure 6A:
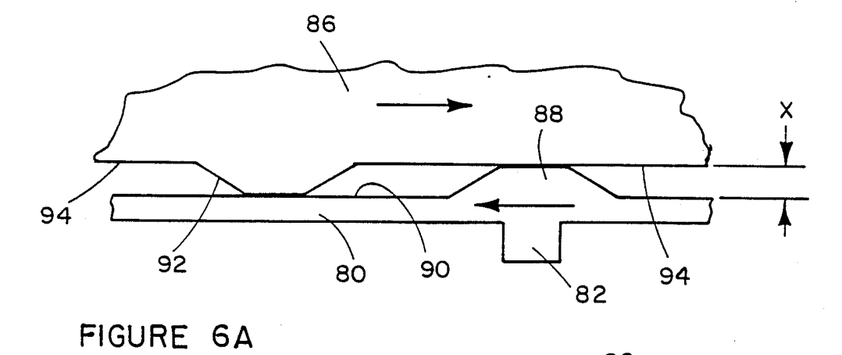
FIGS. 6A, 6B and 6C show the sequential relationship between two cam surfaces which are used in the second embodiment of the present invention illustrated in FIG. 5.
Figure 6B:
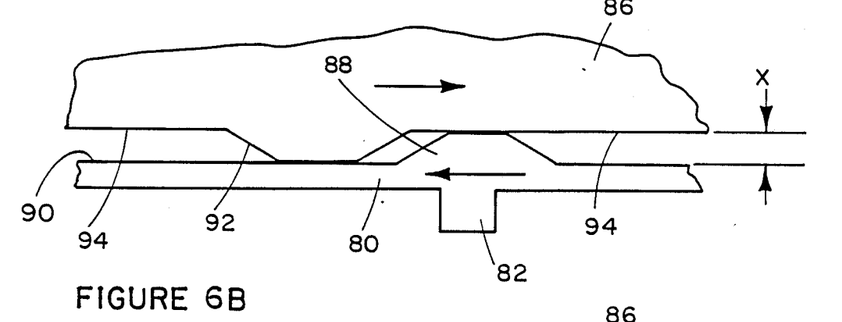
Figure 6C:
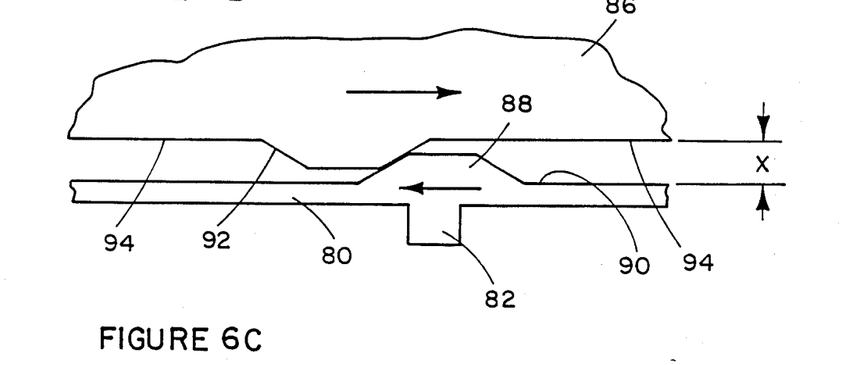

The relative rotational movement of the first cam member 80 and the second cam member 86 is illustrated in FIGS. 6A, 6B and 6C. FIG. 6A represents a rollout view of the relative position between the first and second cam members when the second and third rotatable members are associated together in the positions indicated in FIG. 5. Dimension X in FIG. 6A represents the relative distance between surface 94 and surface 90 when the raised cam portions 88 and 92 are not in contact with each other and, therefore, no axial force is exerted against the third rotatable member by the interaction of the first cam member 80 and the second cam member 86.

FIG. 6B illustrates the first and second cam members as they move relative to one another as a result of relative rotation between the second and third rotatable members. As can be seen in FIG. 6B, the raised portions 88 and 92 have moved toward each other relative to their positions in FIG. 6A but, as can also be seen, no contact has occurred between them. Therefore dimension X in FIG. 6B is the same as dimension X in FIG. 6A.

FIG. 6C represents the contact between the cam portions 88 and 92. As in FIG. 6A and 6B, the relative movement of the first cam member 80 and the second cam member 86 in FIG. 6C is represented by the arrows in the figures. In FIG. 6C, it can be seen that the raised portions 88 and 92 have moved into contact with each other and the ramp surfaces of these two raised portions have caused surfaces 94 and 90 to move apart. The distance between these two surfaces as represented by dimension X, is greater in FIG. 6C than in FIG. 6A and 6B. This movement of surfaces 94 and 90 away from each other as a result of the interaction of the raised cam surfaces 88 and 92 results in a relative axial movement of the second and third rotatable members away from each other. Since the axial position of the second rotatable member 18 is fixed relative to the shaft 58 and the axial position of the third rotatable member 30 is changeable because of the sliding relationship between the third rotatable member and surface 70 of the shaft 58, the movement illustrated in FIG. 6C results in the third rotatable member 30 moving toward the left in FIG. 5 against the force of the spring 60.

The axial movement of the third rotatable member 30 toward the left in FIG. 5 causes the protuberances 44A and 44B to move into interfering relation with the protuberances 46A and 46B which are attached to the housing structure 50 of the gearbox shown in FIG. 5. It should be noted that the protuberances 44A and 44B are located at different radial distances from the axes 20 and 32. Similarly, it should also be noted that protuberances 46A and 46B are located at different radial distances from these axes of rotation. In FIG. 5, it can be seen that protuberance 44B will not interfere with protuberance 46B regardless of the axial position of the third rotatable member 30. Also, it can be seen that protuberance 44A will not interfere with protuberance 46A regardless of the axial position of the third rotatable member 30. However, since protuberances 44B and 46A are located at the same radial distance from the axes 20 and 32 and, additionally, since protuberances 44A and 46B are located at the same radial distance from these axes, a movement toward the left by the third rotatable member 30 will cause the protuberances which are located at the same radial distance from the axes of rotation to move into interfering relation with each other and, during the next revolution of the third rotatable member, to move into contact with each other. The use of two pairs of protuberances in the embodiment shown in FIG. 5 permits generally simultaneous contact to be made between two associated pairs of protuberances for the purpose of stopping the rotation of the components of the gearbox. This simultaneous contact between two pairs of protuberances results in a more equally balanced load during the stopping sequence than would be possible with the use of a single Pair of protuberances as illustrated in FIG. 1. Although it should be understood that the present invention can utilize either a single pair of protuberances or two pairs of protuberances, the use of two pairs of protuberances results in an advantage relating to the balancing of the forces during the contact between the moving and stationary protuberances.

In summary, two embodiments of the present invention have been illustrated and described. The first embodiment, shown in FIG. 1, utilizes a cam follower 26 in conjunction with a cam surface 40 to cause an axial movement of the third rotatable member away from the first rotatable member and, as a result, causes the movement of protuberance 44 into interfering relation with the protuberance 46. An alternative embodiment of the present invention, as illustrated in FIG. 5, utilizes a first cam member 80 and a second cam member 86 to provide the axial force necessary to move the third rotatable member away from the second rotatable member and, as a result, to move a pair of movable protuberances into interfering relation with an associated pair of fixed protuberances. While the two embodiments of the present invention described above utilize different specific techniques and components to accomplish the function of stopping the rotation of a plurality of rotatable members, both of the described embodiments of the present invention are similar in that they cause the movement of one rotatable member away from another rotatable member in an axial direction to cause one or more protuberances to move into interfering relation with one or more other protuberances and, eventually, to move into contact with those one or more other protuberances for the purpose of stopping the rotation of the rotatable members. While the subject invention has been described with a high degree of specificity and particular embodiments have been illustrated and described with considerable detail, the present invention should not be considered to be limited to the specific structures described herein. Therefore, it should be understood that other alternative embodiments of the present invention should be considered within the scope of the claims.

I claim:

1. A rotary travel limit stop apparatus, comprising:

a first rotatable gear having a first axis of rotation;

a second rotatable gear having a second axis of rotation, said second rotatable gear being associated in gear mesh relation with said first rotatable gear;

third rotatable gear having a third axis of rotation, said third rotatable gear being associated in gear mesh relation with said first rotatable gear, said second rotatable gear having a number of teeth unequal to the number of teeth of said third rotatable gear, said second and third rotatable gears being associated in gear mesh relation with said first rotatable gear to rotate at different speeds about their respective axes of rotation in response to rotation of said first rotatable gear;

means connected to said second and third rotatable gears for causing said third rotatable gear to move axially away from said second rotatable gear when said first rotatable gear rotates a preselected number of rotations from a predefined initial position; and means for stopping the rotation of said third rotatable gear when said third rotatable gear moves axially away from said second rotatable gear, said stopping means comprising at least one movable stop rigidly attached to said third rotatable gear for rotation abut said third axis of rotation, said stopping means further comprising at least one stationary stop, said movable stop and said stationary stop being arranged to be moved into interfering relation with each other when said third rotatable gear moves axially away from said second rotatable gear.

2. The apparatus of claim 1, wherein:

said causing means comprises a cam follower connected to said second rotatable gear and a cam surface member connected to said third rotatable gear.

3. The apparatus of claim 2, wherein:

said cam follower comprises a roller rotatably attached to said second rotatable gear.

4. The apparatus of claim 1, wherein:

said causing means comprises a first cam member attached to said second rotatable gear and a second cam member attached to said third rotatable gear, said first and second cam members having cam surfaces disposed in sliding contact with each other.

5. The apparatus of claim 1, wherein:

said second and third axes of rotation are coincident with each other.

* * * * *